(12) United States Patent
Bruset et al.

(10) Patent No.: US 8,967,856 B2
(45) Date of Patent: Mar. 3, 2015

(54) SEMICONDUCTOR TEMPERATURE SENSORS

(75) Inventors: Ola Bruset, Sjetnemarka (NO); Stein-Erik Weberg, Heimdal (NO); Per Carsten Skoglund, Melhus (NO); Werner Luzi, Raelingen (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 13/984,258

(22) PCT Filed: Feb. 7, 2012

(86) PCT No.: PCT/GB2012/050261
§ 371 (c)(1),
(2), (4) Date: Oct. 22, 2013

(87) PCT Pub. No.: WO2012/107749
PCT Pub. Date: Aug. 16, 2012

(65) Prior Publication Data
US 2014/0294042 A1    Oct. 2, 2014

(30) Foreign Application Priority Data
Feb. 7, 2011  (GB) ................... 1102070.8

(51) Int. Cl.
*G01K 11/00* (2006.01)
*G01K 7/32* (2006.01)
(52) U.S. Cl.
CPC ..................... *G01K 7/32* (2013.01)
USPC .................... 374/117; 374/170

(58) Field of Classification Search
USPC .................................... 374/117, 170
See application file for complete search history.

(56) References Cited

U.S. PATENT DOCUMENTS

| 4,448,549 | A | * | 5/1984 | Hashimoto et al. | ........... 374/170 |
| 7,619,486 | B1 | * | 11/2009 | Lesea | ........................... 331/176 |
| 7,831,873 | B1 | * | 11/2010 | Trimberger et al. | ......... 714/725 |
| 8,754,702 | B2 | * | 6/2014 | Walley | ......................... 327/512 |
| 2002/0181543 | A1 | | 12/2002 | Yin | |
| 2003/0156622 | A1 | | 8/2003 | Gold | |
| 2004/0143410 | A1 | | 7/2004 | Clabes et al. | |
| 2005/0114061 | A1 | | 5/2005 | Gauthier | |
| 2005/0180488 | A1 | * | 8/2005 | Rusu et al. | .................... 374/141 |
| 2006/0038626 | A1 | | 2/2006 | Duval et al. | |
| 2006/0238267 | A1 | * | 10/2006 | Bienek et al. | ................ 331/176 |
| 2007/0081575 | A1 | * | 4/2007 | Liu et al. | ...................... 374/111 |
| 2007/0160113 | A1 | | 7/2007 | Kim | |

(Continued)

OTHER PUBLICATIONS

Notification of Transmittal of International Search Report and Written Opinion for PCT/GB2012/050110 mailed May 30, 2012.

(Continued)

*Primary Examiner* — Mirellys Jagan
(74) *Attorney, Agent, or Firm* — Koppel, Patrick, Heybl & Philpott

(57) ABSTRACT

A temperature sensing device for an integrated circuit comprises an oscillator (2) having a characteristic frequency dependent on the temperature and a digital counter (16) arranged to count a number of pulses generated by the oscillator (2) in a given time interval, or the time taken for the oscillator to generate a given number of pulses. Either of these gives a measured value. The device is configured to use a difference between the measured value and a stored reference value in a linearisation algorithm to estimate a temperature.

12 Claims, 4 Drawing Sheets

(56) References Cited

U.S. PATENT DOCUMENTS

| | | | |
|---|---|---|---|
| 2008/0238563 A1* | 10/2008 | Kim et al. | 331/176 |
| 2008/0317097 A1* | 12/2008 | Sohn | 374/172 |
| 2010/0189160 A1* | 7/2010 | Kim et al. | 374/170 |
| 2012/0051395 A1* | 3/2012 | Chen et al. | 374/142 |
| 2012/0140792 A1* | 6/2012 | Yeh | 374/170 |
| 2012/0170616 A1* | 7/2012 | Tsai et al. | 374/163 |
| 2012/0257650 A1* | 10/2012 | Chowdhury | 374/178 |
| 2012/0307867 A1* | 12/2012 | Chung et al. | 374/170 |
| 2013/0202008 A1* | 8/2013 | Myers et al. | 374/1 |
| 2014/0016669 A1* | 1/2014 | Chowdhury et al. | 374/178 |

OTHER PUBLICATIONS

UK Combined Search and Examination Report for Application No. GB1202040.0 (Priority GB1102070) dated Mar. 15, 2012.

UK Intellectual Property Office, Notification of Grant: Patent Serial No. 2484858 (Application No. GB1202040.0; Priority GB1102070), dated Feb. 12, 2013; & UK Patent GB2484858 dated Mar. 13, 2013.

Kim, et al, "A 366kS/s 400uW 0.0013mm2 frequency-to-digital converter based CMOS temperature sensor utilizing multiphase clock", IEEE 2009, Custom Integrated Circuits Conference, p. 203.

* cited by examiner

SEMICONDUCTOR TEMPERATURE SENSORS

BACKGROUND OF THE INVENTION

This invention relates to apparatus and methods for sensing temperature, particularly in the context of semiconductor-based integrated circuits.

It is known in the art to provide a semiconductor device which has the facility to measure temperature in the vicinity of the device. For example, it has been proposed by Kisoo Kim; Hokyu Lee; Sangdon Jung and Chulwoo Kim " A 366 kS/s 400 µw 0.0013 mm$^2$ frequency-to-digital converter based CMOS temperature sensor utilising multi-phase clock" custom integrated circuits conference 2009 IEE to provide a temperature sensor which uses a temperature-sensitive oscillator and a temperature-insensitive oscillator respectively to increment and decrement a counter in order to give an indication of temperature based on the residual count. However, the present Applicant has appreciated that improvements on this approach are possible.

BRIEF SUMMARY OF THE INVENTION

When viewed from a first aspect the invention provides a temperature sensing device for an integrated circuit comprising an oscillator having a characteristic frequency dependent on the temperature and a digital counter arranged to count a number of pulses generated by the oscillator in a given time interval, or the time taken for the oscillator to generate a given number of pulses to give, in either case, a measured value, wherein said device is configured to use a difference between the measured value and a stored reference value in a linearisation algorithm to estimate a temperature.

Thus it will be seen by those skilled in the art that in accordance with the invention a temperature sensitive oscillator is used to give an estimate of its ambient temperature by comparing a count derived from its oscillations with a stored reference value. The difference is then used in a linearisation algorithm to calculate a temperature. This reflects the Applicant's appreciation that the dependence of the oscillation frequency of the oscillator on temperature may not be linear over the desired range of temperature measurement. The linearisation algorithm could be theoretically or empirically predetermined (or a mixture of both) or could be at least to some extent determined dynamically based on other factors such as other measured parameters. It has been found that in at least some embodiments in accordance with the invention, a temperature sensor can be provided on a semiconductor device which has a high accuracy over the entire desired temperature range (e.g. −40° C. to +85° C.) whilst giving low current consumption and a very small additional area on the chip. Furthermore, it is possible to achieve good accuracy with a very short test time which can lead to a relatively high conversion rate e.g. up to 30 kilo-samples per second, whilst minimising power consumption.

The temperature-dependent oscillator could take a number of forms but in a preferred set of embodiments, it comprises a ring oscillator, preferably comprising a plurality of inverters connected together in a ring so that the output of one inverter is the input to the next in the ring. Ring oscillators are relatively easy to implement on semiconductors and are relatively efficient in their use of space on the chip.

Although the invention may be implemented by measuring the time for the oscillator to generate a given number of pulses, it is preferred that the number of pulses generated in a given time is measured instead. In some circumstances having a fixed measurement time is advantageous in that the temperature measurements can be delivered at precisely predictable times.

In a preferred set of embodiments, the time measurement is carried out by counting the number of pulses generated by a second oscillator which has a low or negligible dependence on temperature within the desired measurement range. In preferred embodiments, the second oscillator comprises a crystal oscillator, conveniently the crystal oscillator used to clock the rest of the integrated circuit, although this is not essential.

The frequency dependent oscillator could be arranged to run continuously, although preferably the device is configured to activate the frequency dependent oscillator only when a temperature measurement is required. The requirement for a temperature measurement may come from a process within the device, from an external device, or may be determined according to a timing schedule. If the second, timing oscillator is not activated when a request for temperature measurement is received, this may be activated too.

Preferably the integrated semiconductor device comprises a radio transmitter.

The stored reference value could be obtained during operation of the device—e.g. using another means of temperature measurement to perform a calibration, but conveniently the reference value is stored when calibration takes place during production. Preferably the stored reference value corresponds to a temperature within the range 15° to 35°. The linearisation algorithm could take any convenient form, but in a set of preferred embodiments comprises a plurality of splines—e.g. linear or second order polynomial splines fitted to a known temperature-frequency relationship.

The linearisation could be applied at any convenient point in the calculation—e.g. to the raw count from the counter before conversion to a temperature value or after such a conversion. Linearisation need not be applied across the whole temperature range—one or more parts of the temperature range may be determined to be sufficiently linear that linearisation is not applied.

BRIEF DESCRIPTION OF THE DRAWINGS

A preferred embodiment of the invention will now be described, by way of example only, with reference to the accompanying drawings in which.

DETAILED DESCRIPTION OF THE INVENTION

Figure 1:
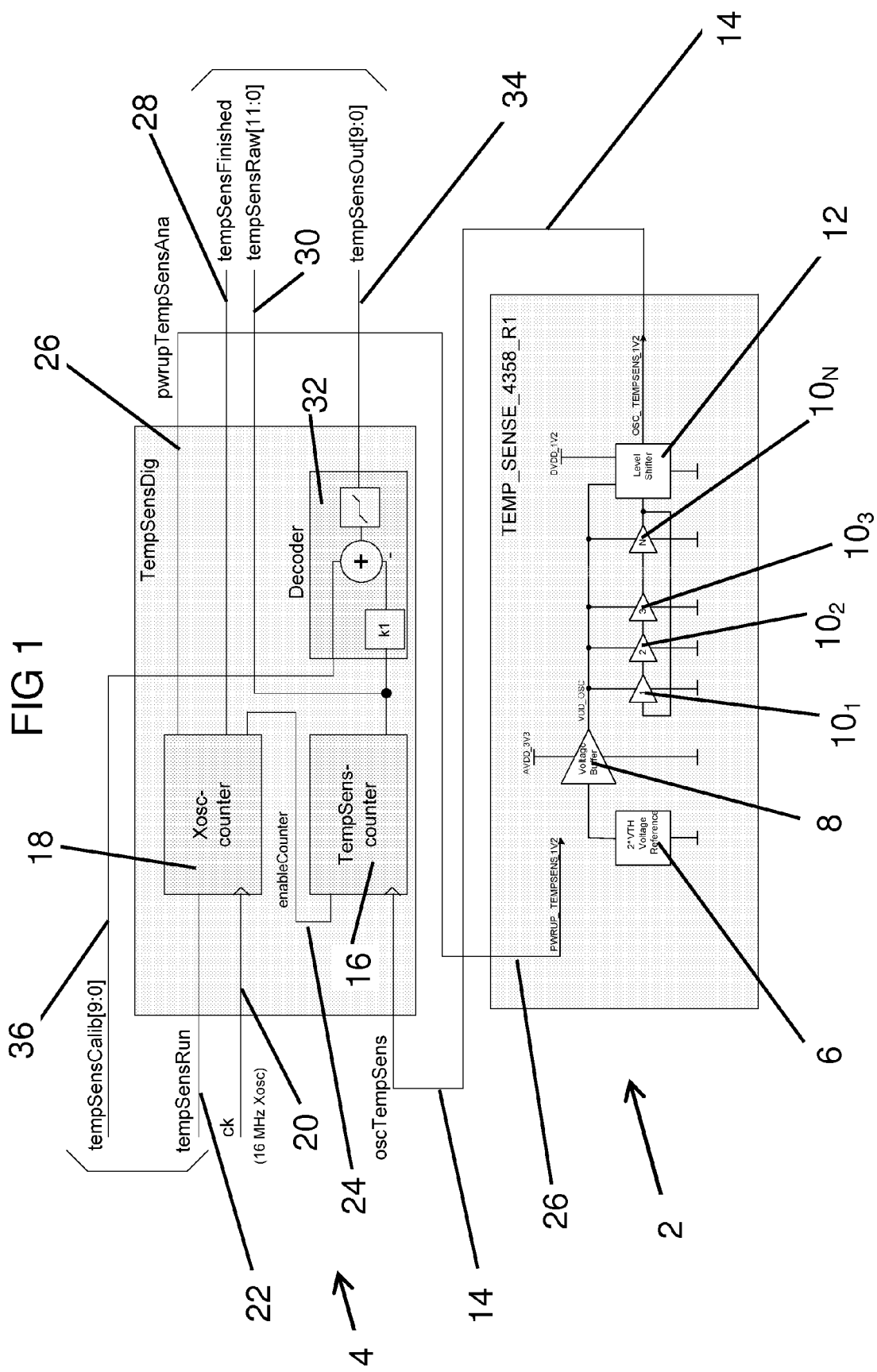
FIG. 1 is a schematic view of the respective analogue and digital parts of a embodiment of the invention.

Turning to FIG. 1, there may be seen schematically the main elements of a temperature sensing device in accordance with an embodiment of the present invention. The device is divided into two main parts: the analogue part 2 and the digital part 4. The analogue part 2 comprises a ring oscillator of a general form known in the art. Briefly, a voltage reference component 6 is connected as the input to a voltage buffer 8. The reference voltage is generated by forcing a reference current of 10 uA into the supply voltage port of a CMOS inverter with input and output connected together. This provides a buffered output of about twice the threshold voltage of the inverters as a voltage reference which supplies a series of N inverters $10_1, 10_2, \ldots 10_N$. This arrangement makes the oscillation frequency less sensitive to process and supply voltage variation and suppresses noise from the power supply. The inverters $10_1, 10_2, \ldots 10_N$ further connected together so that the output of each is connected to the input of the next. The output of one of the inverters $10_N$ is connected to a level shifter 12, the output 14 of which provides the regular pulse to the digital part of the circuit 4 at an appropriate level. In one example the ring oscillator comprises 23 inverters, i.e. N=23.

The pulse input from the ring oscillator 14 is fed into a first counter 16. The digital circuit 4 also comprises a second counter 18 which receives a clock input 20 from a 16 MHz crystal oscillator (not shown) which is the main clock source for the whole semiconductor device of which the circuits 2, 4 described here are a small part. The second counter 18 also receives a control input 22 which determines when it operates.

One output 24 from the second counter 18 is used to enable a counting operation by the first counter 16 for a pre-programmed time corresponding to a pre-programmed number of pulses from the crystal clock input 20. This is initiated by the control input 22. Another output 26 from the second counter provides a control signal to the ring oscillator 2 to enable to power it up shortly before the first counter 16 begins counting is enabled to allow for start-up of the analogue section and debouncing. For example a delay of 48 crystal clock cycles might be implemented. The third output 28 gives a signal to indicate when the second counter 18 has reached the designated count—i.e. when the measurement has been taken.

The first counter 16 gives an output 30 which is a binary number corresponding to the number of pulses of the ring oscillator counted during the count duration. this number is of course dependent on last in the characteristic oscillation frequency of the ring oscillator 2 which is, in turn, dependent on ambient temperature.

Figure 2:
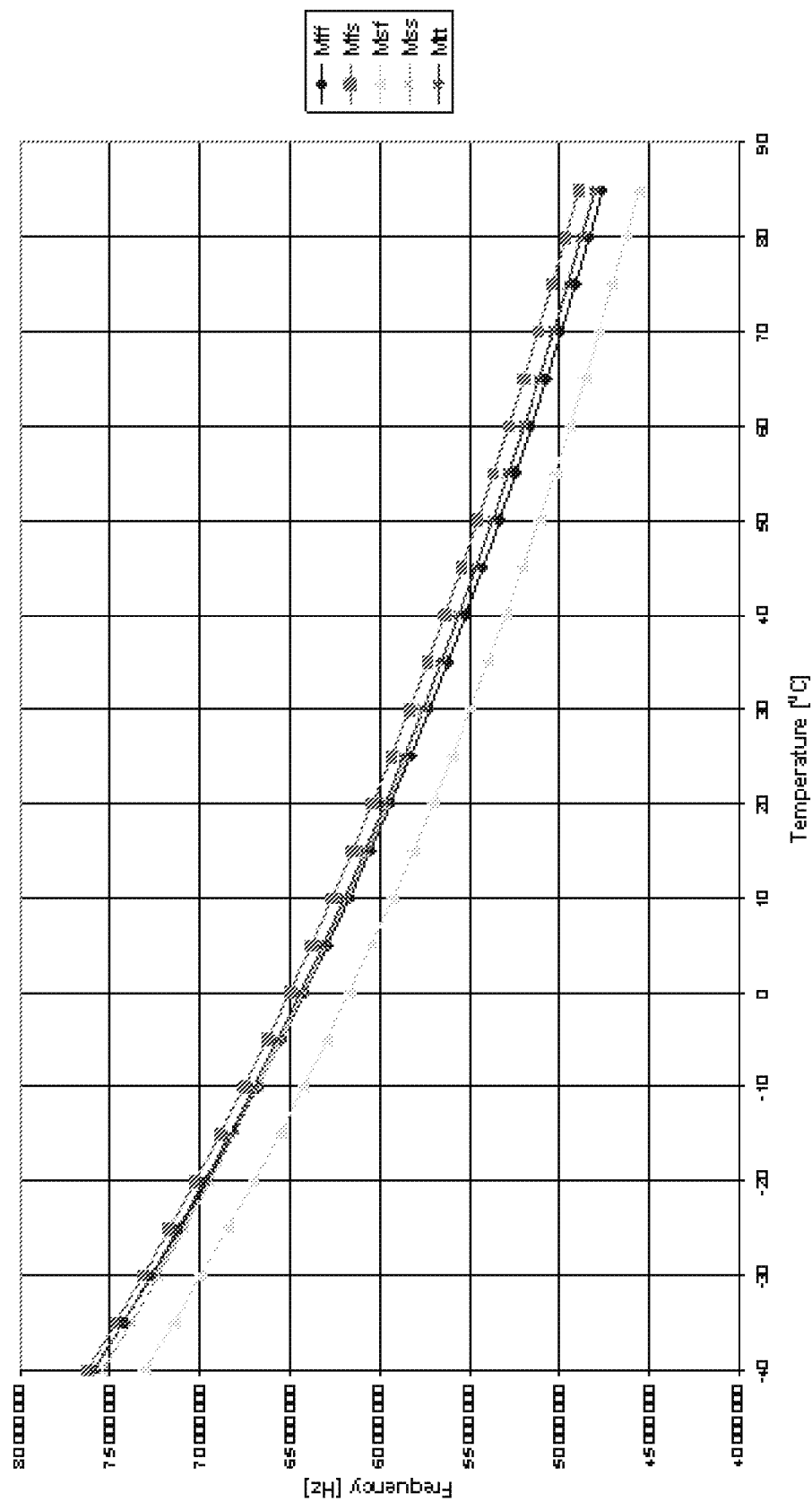
FIG. 2 is a representative graph of the nonlinear dependence between temperature and frequency for a typical ring oscillator.
Figure 3:
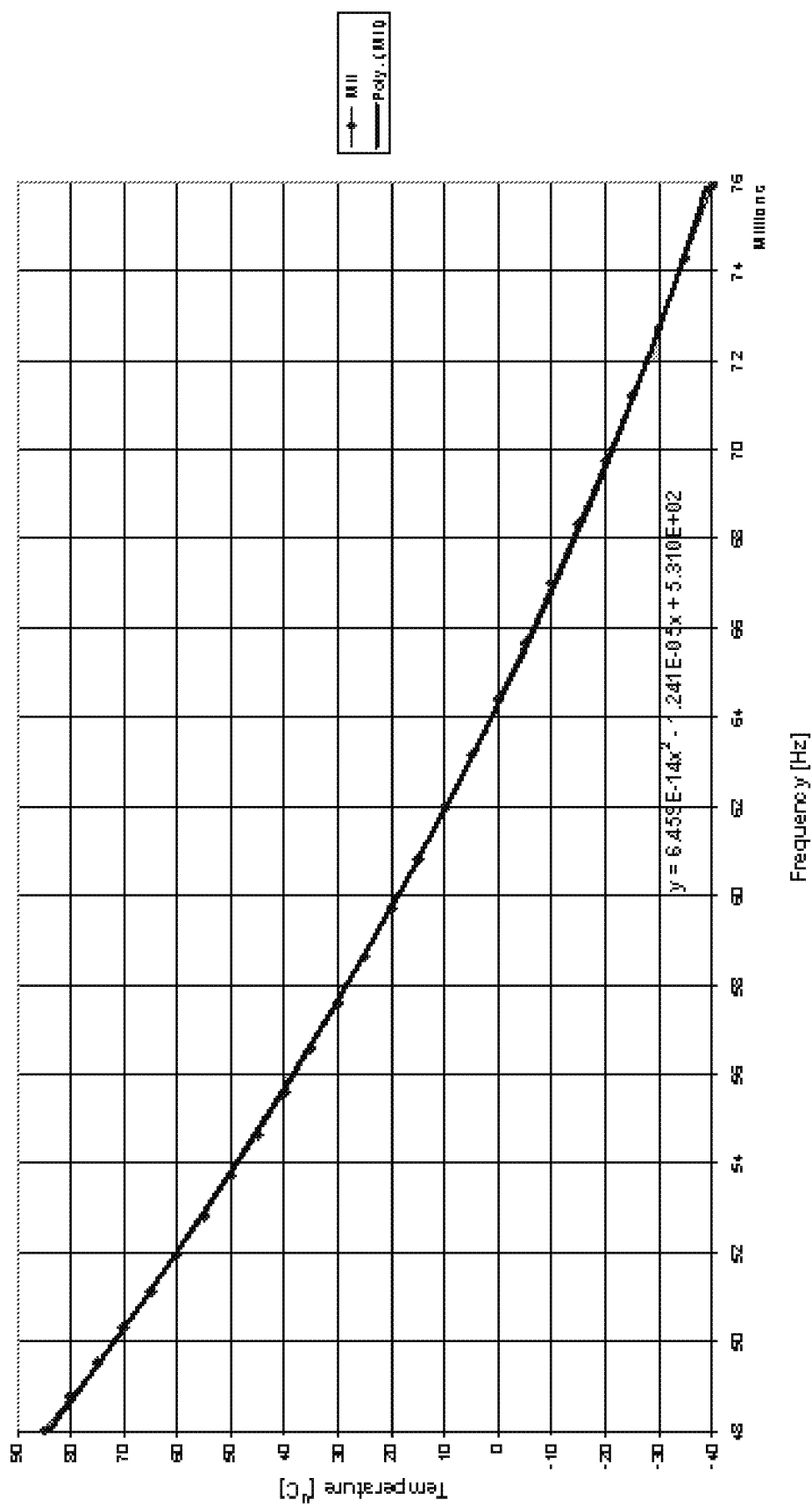
FIG. 3 is a modelled relationship between temperature and frequency derived from the plots in FIG. 2.

FIG. 2 shows various plots of the relationship between characteristic oscillation frequency and temperature for a number of different practical implementations of the ring oscillator 2. The differences between the plots reflect the effect of manufacturing variations. It will be seen in particular that the plots are slightly offset relative to one another but have broadly the same shape. Although the shape of the plotted curves is almost linear, it is not quite. FIG. 3 shows a second-order polynomial curve-fit based on an average of the plots. Other approximations are possible—such as a simple combination of linear splines for example. The approximated relationship shown in FIG. 3 is programmed into a decoder 32 which receives the raw temperature measurement count 30 from the first counter as an input. The decoder 32 then uses the count value and a stored reference calibration value 36 which is stored in a register (not shown) elsewhere on the device in an algorithm based on the fitted curve shown in FIG. 3 to calculate an estimate of temperature which is provided on an output 34.

Operation of the device shown in FIG. 1 will now be described. Whenever a temperature reading is required, which may be according to a fixed schedule or as otherwise demanded by hardware, firmware or software, a signal is received on the control input 22 to the second counter 18. This causes its outputs 24, 26 to activate the first counter 16 and ring oscillator 2 respectively. In the ring oscillator 2 a high pulse ripples from one inverter 10 to the next around the ring at a rate which is dependent on the ambient temperature. The output 14 of one of the inverters $10_N$ therefore gives a periodic pulse, the frequency of which depends on temperature. In one example the frequency varies between 40 MHz and 80 MHz across the temperature range (−40° C. to +85° C.) and thus at normal temperatures the frequency is approximately 60 MHz.

The output pulses 14 from the ring oscillator are counted by the first counter 16. At the same time the second counter 18 is counting pulses from its 16 MHz clock input 20. When the second counter reaches a predetermined count, say 512 corresponding to a time of 32 microseconds, the activate signal 24 to the first counter 16 is taken low, causing the first counter 16 to stop counting. The value of the 12-bit number counted by the first counter 16 and stored in a register within the first counter is proportional to the frequency of the ring oscillator and thus dependent on temperature. This raw, temperature-dependent number is provided on the output 28 to the decoder 32 which converts it into a temperature using the modelled relationship depicted in FIG. 3 and the calibrated offset value provided on the its calibration input 36. The resulting temperature signal 34 is given on the decoder's output is a 10 bit number which gives temperature to the nearest ¼° C. and may be used to feed a display, a monitoring module, for transmission over a radio link or indeed for any other purpose.

A specific example of the embodiment described above will now be given in slightly greater detail.

To obtain sufficient accuracy a sufficient number of pulses must be counted. Because the two oscillators (the crystal clock 20 and the ring oscillator 2) are not synchronous, there will be an inherent uncertainty of one pulse measured on the ring oscillator output 14. In one exemplary embodiment the first counter 16 is a 12 bit counter and the counting interval is 512 pulses of the 16 MHz crystal clock. Given a nominal room-temperature frequency of the ring oscillator 2 of 60 MHz, this gives a typical count value reading of 512*60/16=1920 at the output 30 of the first counter.

Given a temperature coefficient of −3600 ppm/° C. a temperature difference of +1° C. will result in the counter value changing by an amount equal to 1*3600e−6*1920=−6.9 cycles. I.e. a measurement uncertainty of one cycle equates to a measurement inaccuracy of 1/6.9=0.15° C., which is fully acceptable.

In addition to the counting interval of 512 pulses, some time is needed for startup of the analogue part as well as some cycles for debouncing of the ring oscillator 2. A delay of 48 cycles of the 16 MHz crystal oscillator is therefore added before counting of the ring oscillator pulses 14 starts. The total measurement time will therefore be 512+32+16=560 cycles @ 16 MHz=35 microseconds. This allows a high sampling frequency to be supported—e.g. up to approximately 30 kilo-samples per second if required.

As mentioned previously, the 12-bit raw data 30 from the first counter 16 must be decoded to temperature in degrees before being output. This can be done fully combinatorially if fixed multiplication constants are used. In this specific example, a simple linearisation is applied. It has been found that the following equation gives acceptable accuracy around room temperature (+10 to +50° C.).

$T_4 = k2 - k1*\text{tempSensRaw}$, (where $T_4$ is temperature in units of ¼° C.)

Where the constants are:

$k1 = \frac{1}{2}*(1 + 1/8 + 1/16) = 0.5938$ $k2 = 512 + \text{tempSensCalib}$ tempSensRaw is the raw count provided by the first counter 16 at its output 30; and tempSensCalib is the stored reference value supplied to the calibration input 36.

A typical reading of tempSensRaw=1920 at room temperature, and tempSensCalib default value of 720 gives k2=512+720=1232. Inserting this into the equation (and dividing by 4 to get degrees C.) gives:

$$T_4 = 1232 - 0.5938 * 1920 = 91.9$$

$$T = T_4/4 = 91.9/4 = 23.0° C.$$

As mentioned above, this simple equation works well for the temperature range +10 to +50° C. Outside this range, the nonlinear curvature of the measurement results in a negative offset, which increases towards each end of the temperature range.

A simple linearization method has been used to improve this:

if ($T_4 < 40$) then $$T_{4\_LIN} = T_4 + \frac{1}{4}*(40 - T_4)$$

else if ($T_4 > 160$)

$$T_{4\_LIN} = T_4 + \frac{1}{4}*(T_4 - 160)$$

else $$T_{4\_LIN} = T_4$$

where $T_4$ and $T_{4\_LIN}$ are the respective measured and linearised temperature values in units of 0.25° C.

In other words, below a measured temperature of +10° C., one quarter of the measured difference from +10° C. is added to the measured value before readout.

Likewise above +40° C., one quarter of the measured difference from +40° C. is added to the measured value before readout.

Initial zero-point calibration is carried out at the factory after manufacture. The algorithm described above is run at a fixed temperature (e.g. 25° C.) and the resulting count form the ring oscillator is used as an input to an algorithm to calculate a reference value which is stored on the chip. The decoder effectively uses the difference between the measured count value 30 and the reference value 36 to calculate the temperature difference (positive or negative) between the actual temperature and the calibration temperature (e.g. 25° C.) using the modelled temperature dependence of the frequency depicted in FIG. 3 based on the (empirically verified) assumption that shape of this curve is very similar over the usual range of process variations and that only the offset is affected by such variations.

It has been found in experiments that by employing devices embodying the invention, a temperature accuracy of <1% can be achieved which compares favourably with the typical accuracy of only 5-10% found on known on-board chip temperature sensors. Moreover this is achieved with very little addition to the component count our layout area.

Figure 4:
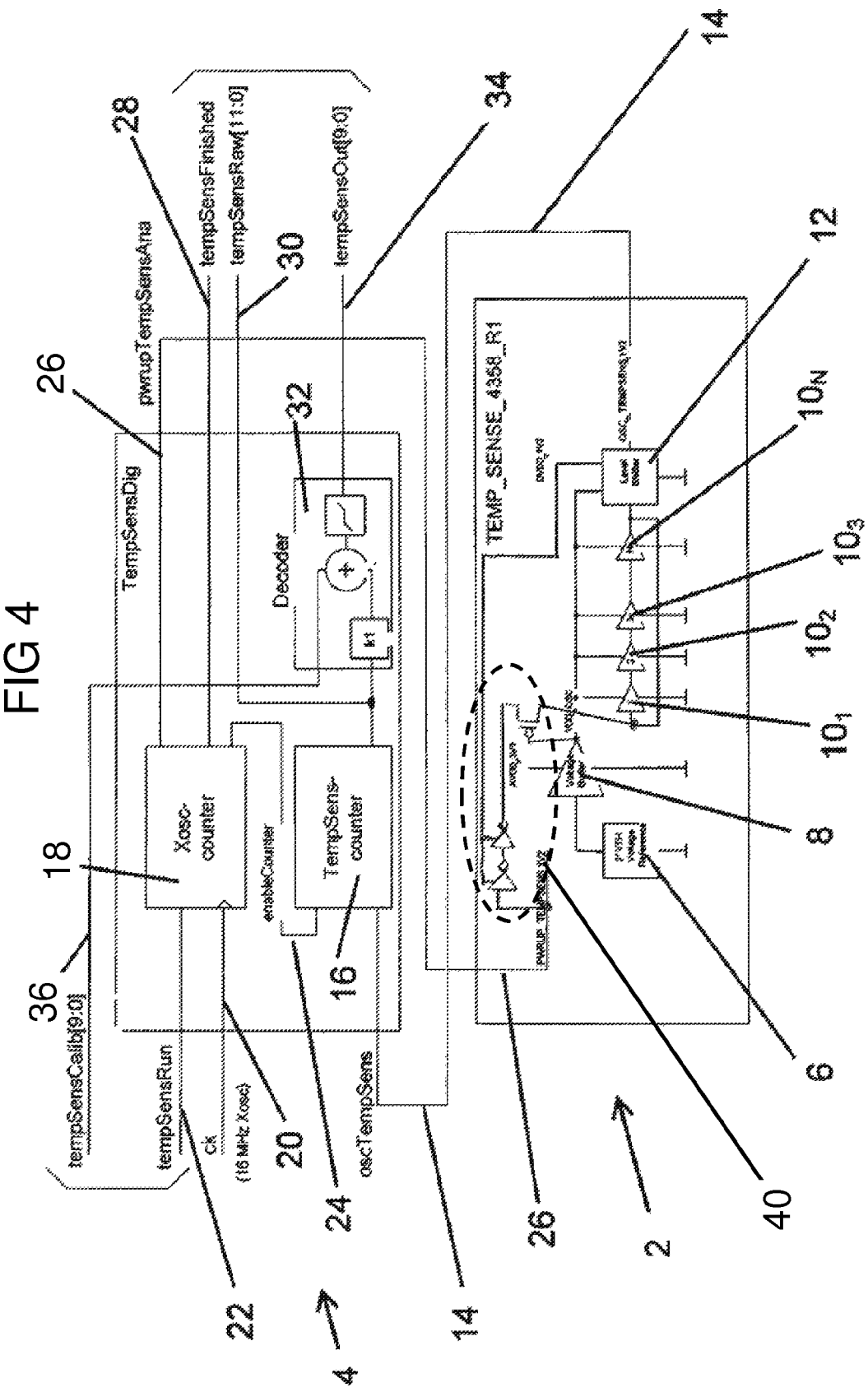
FIG. 4 is a schematic view of a variation of the embodiment shown in FIG. 1.

A further embodiment of the invention is shown in FIG. 4. This is identical to the embodiment shown in FIG. 1 (and thus common reference numerals are used) except that some additional components 40 have been added to help ensure that the oscillator starts in a controlled (stable) state. This helps to eliminate a potential problem with multiple "waves" circulating the loop simultaneously. With the added circuitry 40 a strong pull to "high" is achieved on the first inverter input while the supply voltage $VDD_{OSC}$ is rising. When the supply voltage $VDD_{OSC}$ has risen sufficiently, the PMOS transistor is shut off and the oscillation starts.

Many variations and modifications to the described embodiment may be made within the scope of the invention. For example it is not essential to count pulses from the temperature-dependent oscillator for a fixed time; instead the time taken to reach a given count could be measured. Moreover a ring oscillator is not essential; other types with appropriate temperature dependence could be used.

The invention claimed is:

1. A temperature sensing device for an integrated circuit comprising a temperature-dependent oscillator having a characteristic frequency dependent on temperature, said temperature-dependent oscillator comprising a plurality of inverters connected together in a ring so that an output of a first inverter in the ring is an input to an adjacent inverter in the ring, and a digital counter arranged to count a number of pulses generated by the temperature-dependent oscillator in a given time interval, or a time taken for the temperature-dependent oscillator to generate a given number of pulses to give, in either case, a measured value, wherein said device is configured to use a difference between the measured value and a stored reference value in a linearisation algorithm to estimate a temperature; wherein said device further comprises a voltage reference which supplies said inverters, said voltage reference comprising an inverter having an input and an output with its input and output connected together, and wherein said device further comprises a voltage buffer having an input connected to the voltage reference.

2. The device of claim 1, further arranged to measure a number of pulses generated in a given time.

3. The device of claim 1, further configured to activate the temperature-dependent oscillator only when a temperature measurement is required.

4. The device of claim 1, wherein the integrated circuit comprises a radio transmitter.

5. The device of claim 1 wherein the stored reference value corresponds to a temperature within the range 15° Celsius to 35° Celsius.

6. The device of claim 1, wherein the linearisation algorithm comprises a plurality of splines.

7. A device as claimed in claim 6, wherein the splines are linear or second order polynomial splines fitted to a known temperature-frequency relationship.

8. The device of claim 1, further arranged to carry out a time measurement by counting the number of pulses generated by a second oscillator which has a low or negligible dependence on temperature within a desired measurement range.

9. The device of claim 8, wherein the second oscillator comprises a crystal oscillator.

10. The device of claim 8, wherein the second oscillator is used to clock a remainder of the integrated circuit.

11. An integrated circuit comprising a temperature sensing device as claimed in claim 1.

12. The integrated circuit of claim 11, further comprising a radio transmitter.

* * * * *